Jan. 10, 1961  R. R. PETERSON  2,967,606
VIBRATORY HELICAL CONVEYOR
Filed Aug. 12, 1958  2 Sheets-Sheet 1

INVENTOR.
ROBERT R. PETERSON

INVENTOR
ROBERT R. PETERSON

United States Patent Office 2,967,606
Patented Jan. 10, 1961

2,967,606

VIBRATORY HELICAL CONVEYOR

Robert R. Peterson, Erie, Pa., assignor to Eriez Manufacturing Co., Erie, Pa., a corporation of Pennsylvania Filed Aug. 12, 1958, Ser. No. 754,571

10 Claims. (Cl. 198—220)

This invention relates to conveyors and, more particularly, to a helical feeding device utilizing a non-linear radial spring system.

The invention discloses a unique springing system together with a member to be helically virated and a suitable means of providing the necessary exciting force. The exciting force applied to the mechanism disclosed herein utilizes a permanent magnet in an electromagnetic field but any suitable type of exciting force, whether mechanical, electrical, or hydraulic, may be applied; however, the uniquely supported motor provides a simpler, more efficient driving means than any heretofore proposed.

The disclosure also shows an improved type of helical feeding device incorporating a unique springing system wherein the springs are loaded in tension or alternately in tension and compression and in bending rather than in pure bending alone as in conventional systems. As a result, the springing force versus bowl displacement and internal spring stress versus bowl displacement are not related linearly as in the case of existing types of springs used in this type of vibratory equipment. This results in an improvement in the design and operation of the device which includes a more stable machine with less sensitivity to changes of the natural frequency of the mass spring system and spurious exterior disturbing forces as will be later described herein.

The invention consists of a series of flat leaf springs arranged radially to a vertical member on a support base. One end of each spring is attached to a suitable massive base and the other end of each spring is attached to the member to be vibrated. The radial springs further have their flat sides rotated from the vertical at a suitable angle with the vertical axis to give the proper relationship between horizontal and vertical displacement.

Further, the center line of the springs may be radially arranged from a common center or offset from a common center. In addition, the center line of the springs may be located angularly from the purely radial position. These configurations may be used in varying degrees to alter the linearity of the springing forces relative to the displacement of the vibrating member. Thus, the spring system linearity may be controlled to any described degree by changing any or all of these factors.

The non-linear spring system herein disclosed has the advantage of substantially increasing the internal damping of the spring system by a non-linear increase in the stresses and not increasing either the displacement or the number of springs. Since this increase in stress is applied in a tensile and/or compressive manner, the fatigue limit of the spring material is substantially increased. Since a considerable portion of the spring force is produced by tension and/or compression, the spring force versus displacement ratio is much greater than with conventional springs in pure bending.

The disclosed system results in a much more stable unit since if the displacement of the unit tends to increase to an uncontrollable degree, the spring constant will increase to the point where the unit detunes itself at the same rate and prevents such uncontrollable conditions.

By variations of the positions of the center lines of the springs, the relationship between the displacement of the spring, the spring constant, and stress on the spring can be made controllably non-linear. This has the advantage of broadening the area in which significant magnification of the disturbing force is produced in that when the magnification is low, so is the damping force. As the system approaches resonance, the magnification increases but is accompanied by similar increase in damping and the displacement, therefore, is more essentially stable. The disclosed invention thus provides for significantly greater internal damping at or near resonance than any conventional system while, at the same time, it has significantly less damping at other points on the operating curve. Thus, greater disturbing forces can be applied to give appreciable movement at point on the resonance curve where the magnification factor is low while excessive and uncontrollable movement is not produced when the system operates at or near resonance.

With one arrangement, when the center lines of the springs are offset from the center of the base and attached to the base at their inner ends and the bowl at their outer ends, the springs are loaded in compression on the up and forward stroke and in tension on the down and backward stroke. Other arrangements, as mentioned, may produce the converse condition. Since most materials are three to four times as stiff in compression as they are in tension, the disclosed spring system will have less acceleration on the upward and forward stroke than on the downward and backward stroke. This is highly desirable since it reduces tray wear and, also, produces more uniform feed.

More specifically, it is an object of this invention to provide a vibratory conveyor which is an improvement over conveyors previously used and, more particularly, it is an object to provide a vibratory conveyor which is simple in construction, economical to manufacture, and simple and efficient in operation.

Another object of the invention is to provide an improved helical conveyor.

Still another object of the invention is to provide a helical conveyor wherein springs are disposed horizontally and extend radially from an upstanding member on a base.

Yet another object of the invention is to provide non-circular springs made of flat straight material which radiate horizontally from a base member.

A further object of the invention is to provide an improved device on a helical parts feeder.

Still a further object of this invention is to provide an improved parts feeder.

Still yet a further object of this invention is to provide an improved drive and springing system for a vibratory parts feeder.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
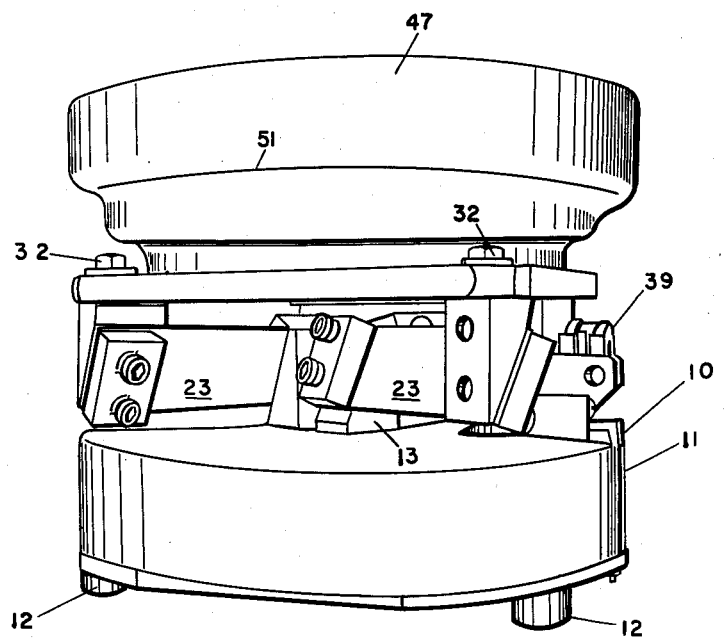
Fig. 1 is an isometric view of a parts feeder according to the invention.
Figure 2:
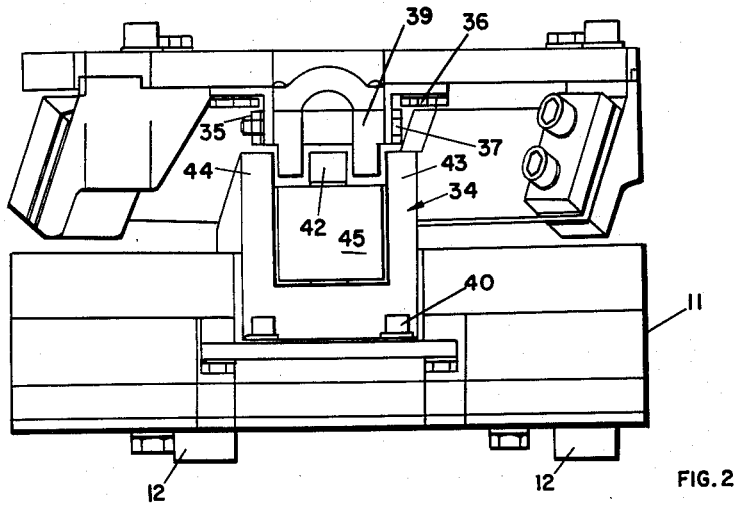
Fig. 2 is a side view of the feeder shown in Fig. 1 with the hopper removed therefrom.
Figure 3:
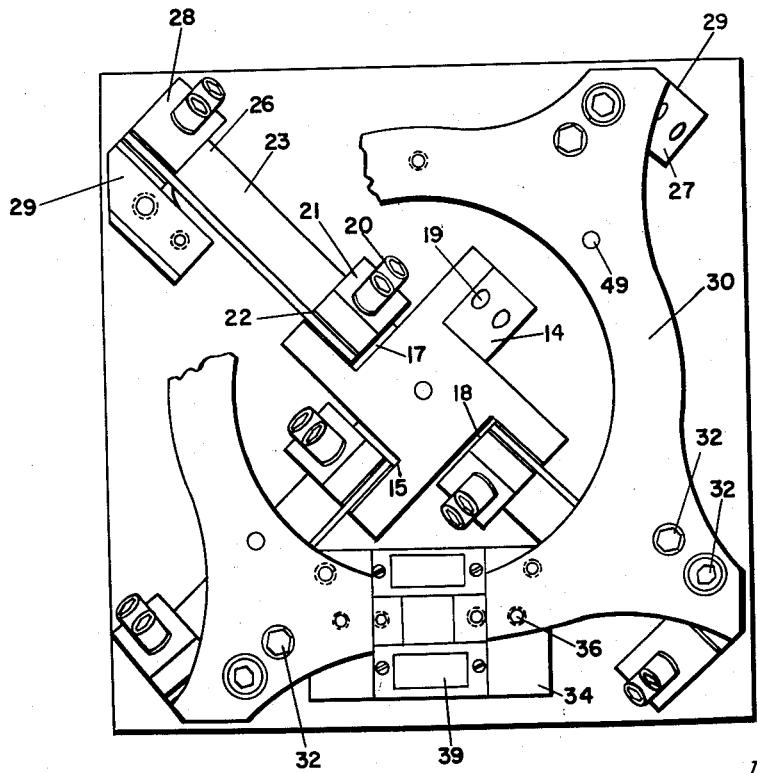
Fig. 3 is a top view of the parts feeder shown in Figs. 1 and 2.

Now with more specific reference to the drawings, a parts feeder 10 is shown having a heavy massive, generally cylindrical base 11 supported on foot pads 12 which are fixed to the base 11 to support the parts feeder 10 on a suitable supporting surface. The center part of the base 11 has an upstanding member 13 thereon which has radially disposed, angularly inclined supporting surfaces 14, 15, 17, and 18 disposed at ninety degree spacings around the upstanding member 13.

The surfaces 14, 15, 17, and 18 have drilled tap holes 19 therein which receive studs 20. The studs 20 extend through backing members 21 which sandwich the ends 22 of leaf springs 23 which are non-circular in cross section and have one cross sectional dimension greater than the other between the backing members 21 and the surfaces 14, 15, 17, and 18. Distal ends 26 of the springs 23 have one side disposed along surfaces 27 and the other surface engaging the inner surface of backing members 28 so that the distal ends 26 of the springs 23 are sandwiched between the backing members 28 and members 29 which have the flat surfaces 27 disposed generally at right angles to the corresponding member on the opposite side of the conveyor and disposed radially around a hopper supporting plate 30.

The hopper supporting plate 30 has the members 29 rigidly attached thereto by means of studs 32 which extend through the plate 30 and engage suitably threaded holes in the members 29. The plate 30 has a permanent magnet 39 rigidly attached thereto by means of brackets 35 which are generally L-shaped and are attached to the permanent magnet 39 by means of bolts 37.

A core 34 is rigidly attached to the base 11 by means of bolts 40 and is generally E-shaped, having legs 44, 42, and 43 and the legs of the permanent magnet 39 interfit with the legs 42, 43, and 44 of the core 34. The central leg 42 has a coil 45 wound thereon which is connected to a suitable source of electrical power.

A hopper 47 is anchored to the plate 30 by means of bolts which extend through holes 49 to anchor the hopper 47 therein. A helical track will be disposed around the inside of the hopper 47 inside an outer curved surface 51 in a conventional manner. Therefore, when the coil 45 is connected to a suitable source of alternating current, the legs 42, 43, and 44 of the core 34 will be magnetized alternately and will induce intermittent forces of opposed polarity in the permanent magnet 39 so that a vibratory force having a frequency equal to the frequency of the line current applied to the coil 45 will be applied to the hopper 47 and, because of the configuration of the springs 23 and the relationship thereof to the base 11 and the hopper 47, the hopper 47 will be vibrated in a helical path and articles of manufacture disposed in the hopper 47 will move up along the track opposite the surface 51.

The foregoing specification sets forth the invention in its preferred practical forms but it will be noted that the structure shown is capable of modification within a range of equivalents without departing from the invention which is to be understood is broadly novel as is commensurate with the appended claims.

The embodiments of the invention in which an exclusive property or privilege is claimed are defined as follows:

1. A vibratory feeder for feeding articles of manufacture comprising a base member extending upwardly and having flat surfaces disposed thereon, said surfaces being disposed at an angle to the horizontal, a plate having spaced members each with a flat surface thereon, the said flat surface on each said spaced member lying in a common plane with a corresponding one of said first mentioned surfaces, flat plate like springs, one end of each said spring being attached to said base member with one side of said spring engaging one said first mentioned surface, the other end of each said spring having one lateral surface on the opposite side from the surface engaging one said first mentioned surface lying on one said surface of one of said spaced members, each said spring lying in a plane disposed at least ten degrees from the vertical, a hopper attached to said plate, said hopper having a helical track attached to the inner periphery and extending therealong, a U-shaped permanent magnet attached to said plate spaced from the center and adjacent an edge thereof with the legs thereof extending downwardly, and an E-shaped member attached to said base member and having a coil of wire attached thereto and connected to a source of alternating current, said legs of said U-shaped magnet interfitting with the legs of said E-shaped member, said magnet and said member being adapted to vibrate said hopper whereby said hopper is vibrated in a helical path and articles of manufacture in said hopper move up said track.

2. A feeder for feeding articles of manufacture comprising a base, flat, straight, plate like resilient springs attached to said base at one end and extending radially outwardly therefrom, means to support a hopper, the distal ends of said springs being attached to said hopper supporting means, said plate like springs having their lateral dimensions disposed at approximately forty-five degrees to a horizontal, a hopper on said support means, said hopper having upwardly extending walls and a helical path attached to the inner periphery of said walls, and means to apply a vibratory force to said hopper whereby said hopper vibrates in a confined inclined helical path.

3. A vibratory feeder comprising a base, straight, laterally extending springs non-circular in cross section having the greatest dimension of the non-circular cross section disposed at substantially less than ninety degrees from the horizontal and attached to said base at one end and extending radially therefrom, means to support a hopper, one of the ends of each of said springs being attached to said hopper, and means to vibrate said hopper support means whereby said hopper support means is vibrated generally in a helical path.

4. The feeder recited in claim 3 wherein said means to vibrate said hopper comprises a magnetic means attached to said hopper support means and spaced from the center and adjacent an edge thereof, and electromagnetic means on said base cooperating with said magnetic means on said hopper support means to vibrate said hopper support means in a helical path.

5. The feeder recited in claim 4 wherein said springs are disposed with the greater dimension of said cross section of said springs being inclined to the vertical.

6. A feeder comprising a base having an upstanding member thereon, straight spring members being non-circular in cross section, said cross section of each said spring member having one dimension greater than the other, the greater dimension of said non-circular cross section being disposed at substantially less than ninety degrees from the horizontal, one end of each said spring member being attached to said upstanding member, said spring members each extending radially from said upstanding member, and a hopper support means, the distal end of each said spring member being attached to said hopper support means.

7. A spring system for supporting a vibratory conveyor comprising a base, flat plate like springs attached to said base and extending radially therefrom, each said flat spring lying in a plane disposed at substantially less than ninety degrees from the horizontal, means to support a conveyor, said springs being attached to said means to support a conveyor at one end and to said base at the other end, and means to vibrate said means to support a conveyor whereby said conveyor vibrates in a helical path.

8. The spring system recited in claim 7 wherein a bowl feeder type hopper is supported on said means to support a conveyor.

9. The spring system recited in claim 8 wherein said means to vibrate said conveyor comprises an electromagnet having one part attached to said means to support a conveyor and the other part attached to said base.

10. The spring system recited in claim 8 wherein said means to support a conveyor has a helical conveyor track attached in said hopper and extending upwardly therein.

References Cited in the file of this patent
UNITED STATES PATENTS

| | | |
|---|---|---|
| 2,735,731 | Freebain et al. | Feb. 21, 1956 |
| 2,790,534 | Spurlin | Apr. 30, 1957 |